Feb. 20, 1940. W. D. T. GREEN Re. 21,360
MANUFACTURE OF PAPER MAKER'S WIRE CLOTH
Original Filed Sept. 7, 1937
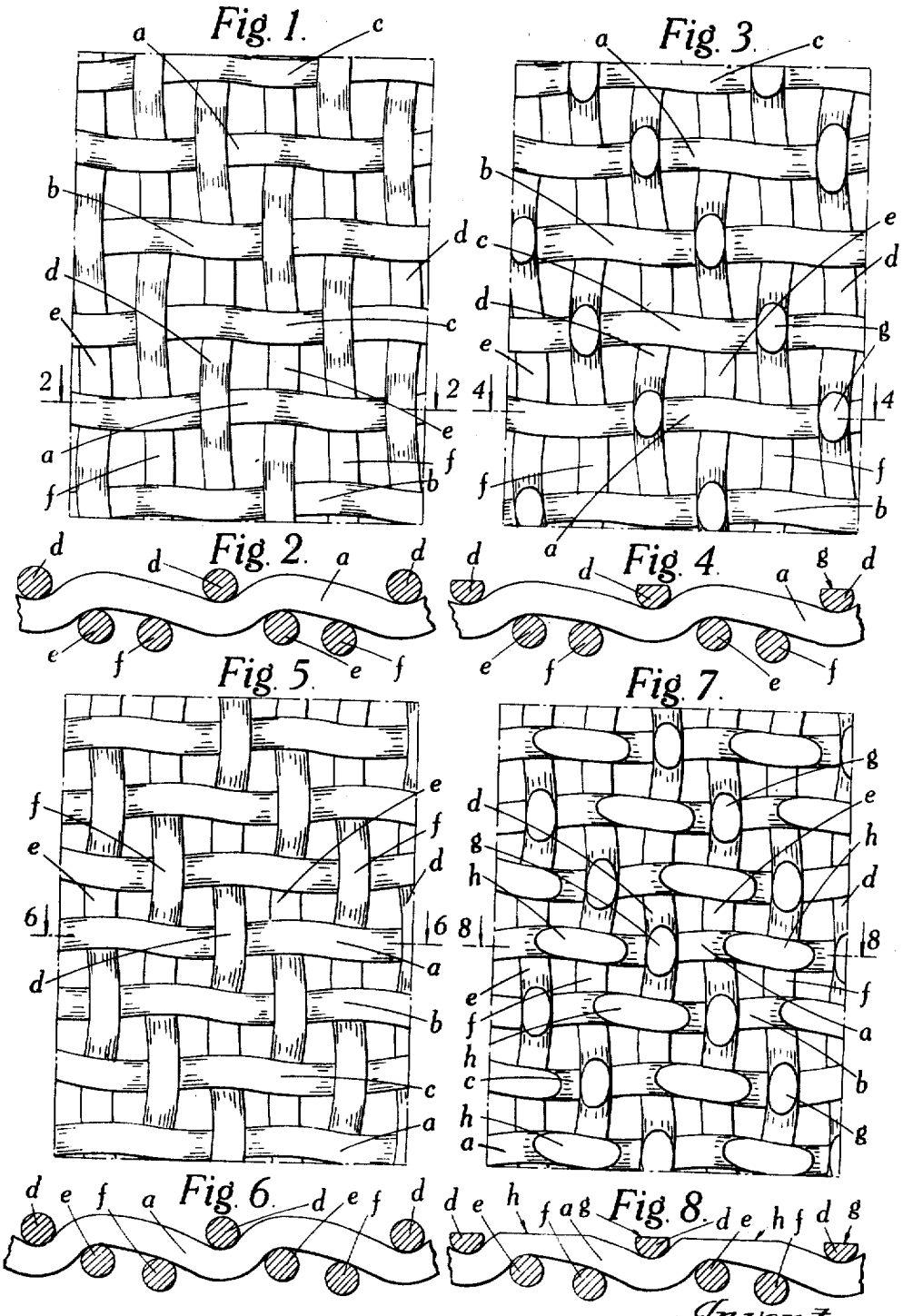
Inventor:
By Willie Dunstan Theodore Green
Williams, Bradbury, McCaleb & Hinkle, Attys Reissued Feb. 20, 1940 Re. 21,360

UNITED STATES PATENT OFFICE 21,360

MANUFACTURE OF PAPER MAKER'S WIRE CLOTH

Willie Dunstan Theodore Green, Edinburgh, Scotland, assignor to The United Wire Works, Limited, Granton, Edinburgh, Scotland Original No. 2,143,552, dated January 10, 1939, Serial No. 162,577, September 7, 1937. Application for reissue November 22, 1939, Serial No. 305,680. In Great Britain April 23, 1937

3 Claims. (Cl. 245—8)

This invention has for its object the production of an improved paper maker's woven wire cloth of the kind woven with a "long crimp", such as a twill weave or multiple weave or any other combination of a twill weave; that is to say, in which round weft wires pass alternately under one round warp wire and over two or more round warp wires, the intersection of weft with warp being advanced by one or more warp wires at each successive pick.

Until recent years, twill weave paper maker's wire cloth has exhibited a weft, the crests of the long crimps of which lie considerably below the level of the crests of the warp knuckles and thus do not provide an adequate paper support.

In order to provide a more adequate paper support, the crests of the long crimps of the weft should be raised as nearly as possible to the level of the crests of the warp knuckles. It is also generally desirable that the weft wires should be equal to or of greater diameter than the warp wires because any reduction of the diameter of the weft wire decreases its ability to control and crimp the warp wires and may result in a flimsy cloth. However, it is my experience that when attempts are made to obtain both these desiderata, the long weft crimps become sloped, due to the control exercised by the warp wires, with the result that instead of the web of paper being supported on the warp knuckles and the whole of the long weft crimps, it is supported either on the warp knuckles alone, or on the warp knuckles and the highest ends only of the long weft crimps.

The present invention provides an improved twill weave or long crimp paper maker's wire cloth giving adequate paper support without necessarily decreasing the diameter of the weft wire and without departing from the use of round (i. e. circular section) wire for the warp or for both warp and weft, at the same time obtaining ample drainage characteristics.

The present invention is concerned with a twill weave or multiple weave paper maker's wire cloth in which the warp and weft are of circular cross section and in which the crests of the long weft crimps are raised as nearly as possible to the level of the crests of the warp knuckles, that is to say, the crests of the long crimps of the weft are in a plane which lies at a distance less than half the diameter of the warp wire below the plane of the crests of the warp knuckles. According to the present invention, such a twill weave or multiple weave wire cloth in which the weft wire is preferably equal to or of greater diameter than the warp wire, is subjected to a restricted surface grinding operation. The aforesaid restricted grinding operation is carried to such an extent as to grind off the crests of the sloping long weft crimps, thus forming a flat surface on each long weft crimp. The flat surfaces formed by grinding down the warp knuckles not only in themselves provide additional paper support, but also reduce to nothing the distance between the crests of the long weft crimps and the paper.

In a desirable form of the invention the relative proportions of weft and warp are such that the crests of the long weft crimps are raised slightly above the level or plane of the crests of the outer or raised warp knuckles.

The improved wire cloth provides a paper supporting surface characterized by a series of oval or pear-shaped flat spots on both warp and weft and these afford improved paper support without impairing the drainage efficiency of the cloth. Furthermore, this can be attained without diminishing the diameter of the weft wires.

In order that the invention may be more clearly understood, the accompanying sheet of drawings will be hereinafter referred to; these drawings are reproductions of photomicrographs of sections of paper maker's wire cloth and are reproduced as typical examples and to illustrate the features of the present invention.

Fig. 1 is a plan view of 60 mesh twill weave paper maker's wire cloth and Fig. 2 is a sectional view through one of the weft wires on the line 2—2 of Fig. 1.

Figs. 3 and 4 are views corresponding to Figs. 1 and 2 illustrating the same wire cloth when finished according to the invention.

Figs. 5 and 6 are views corresponding to Figs. 1 and 2, but showing a more closely woven 60 mesh twill weave paper maker's wire cloth before being finished according to the invention, and Figs. 7 and 8 are views similar to Figs. 5 and 6 showing the same wire cloth when finished according to the invention.

The drawings are reproductions of photomicrographs of the wire cloth magnified several times actual size.

The wire cloth shown in Figs. 1 and 2 was made from 0.0096 inch diameter round bronze warp wire and 0.0104 inch diameter round brass weft wire with 60 warp wires per inch and 44 weft wires per inch.

Throughout the drawing the weft wires are designated by the reference characters *a*, *b* and *c* and the warp wires by the characters *d*, *e* and *f*, this system of references being adopted because every fourth wire is a repeat of the first wire. It will also be seen that the weft wires *a* pass under warp wires *d* and over warp wires *e* and *f*, that the weft wires *b* pass under warp wires *e* and over warp wires *f* and *d*, and that the weft wires *c* pass under warp wires *f* and over warp wires *d* and *e*.

Referring now to Fig. 2, what is termed the long crimp of the weft wire is the portion which passes over two warp wires and the crest of this long weft crimp is substantially below the plane of the crests of the raised warp knuckles of the wires *d*, that is to say, where the warp wires *d* pass over the weft wire *a*. The crests of the long crimps of the weft wires *b* and *c* are similarly substantially below the plane of the crests of the raised warp knuckles of the warp wires *d*, *e* and *f*. This is due partly to the diameter of the weft wire exceeding the diameter of the warp wire and partly to the number of beats of weft wire per inch (viz. 44 per inch). It will be obvious that the paper pulp will be supported mainly by the raised knuckles of the warp wires *d*, *e* and *f* and that the paper pulp will sink in the spaces between the warp knuckles until it rests on the long weft crimps; it will be seen furthermore from Fig. 2 that the warp wire *f* is slightly lower than the warp wire *e* where the weft wire *a* passes over them, with the result that the long weft crimp slopes slightly downwards as it passes over the warp wire *f*. The same result occurs throughout the fabric wherever a weft wire passes over the warp wires; this sloping of the long weft crimps is caused by the control of the warp wires upon the weft wires. The control of the warp wires over the weft wires and the consequent sloping of the long weft crimps is accentuated if the diameter of the weft wire is reduced or the number of beats of weft per inch is increased. Either or both of these measures will, however, raise the level of the long weft crimps. The effect of adopting both these measures together is shown in Figs. 5 and 6 which show a twill weave wire cloth woven with 60 warp wires per inch and 55 weft wires per inch, using 0.0096 inch diameter bronze wire and 0.0096 inch brass weft wire. It will be observed that this raises the crests of the long weft crimps approximately to or slightly above the plane of the crests of the raised warp knuckles, but further depresses the warp wire *f* in relation to the warp wire *e* where the weft wire *a* crosses them and thus accentuates the slope of the long weft crimps throughout the cloth. The cloth shown in Figs. 5 and 6 provides a better paper support than the cloth shown in Figs. 1 and 2, but the paper pulp is supported only by the relatively small supporting surfaces afforded by the crests of the raised warp crimps and the sloping weft crimps.

Figs. 3 and 4 illustrate the cloth shown in Figs. 1 and 2 when finished by grinding off the crests of the raised warp knuckles to provide flat surfaces *g*. It will be apparent that the flat surfaces *g* increase the area of the supporting surface for the paper pulp. The crests of the raised warp knuckles are ground down until level with the crests of the long weft crimps, so that the paper pulp will be supported not only by the flat surfaces *g* of the warp knuckles but also by the crests of the long weft crimps.

Figs. 7 and 8 illustrate the cloth shown in Figs. 5 and 6 when finished according to the invention, wherefrom it will be seen that the grinding down of the crests of the raised warp knuckles to produce the flat warp knuckle surfaces *g* also grinds off the crests of the sloping long weft crimps and provides flat spots *h* on the long weft crimps, so that the paper pulp will be supported not only by the flat surfaces *g* of the raised warp knuckles, but also by the flat surfaces *h* on the long weft crimps.

It is to be understood that the invention is not limited to the regular twill weave illustrated in the drawing; the invention can be applied to irregular twill weaves, such as combinations of a twill weave, or multiple weaves in which each weft wire passes over more warp wires than it passes under and in which adjacent weft wires pass under different warp wires. The invention is also not limited to a 60 mesh weave; it may be applied to any regular or irregular twill weave employing round warp and round weft wires, although its chief application will probably be to the meshes of wire cloth approximating to a 60 mesh weave.

It will be observed that circular section wire is used for both warp and weft and the relative cross-sectional areas of the warp and weft wires and the ratio of the number of warp wires per inch to weft wires per inch are so proportioned as to produce weft crimps, the crests of which rise to a plane which either coincides with or is slightly above the plane of the crests of the outer or raised warp knuckles as in Fig. 6, or which lies at a distance less than half the diameter of the warp wire below the plane of the crests of the warp knuckles. It has been previously proposed to inter-weave circular section warp wire with weft wire of flat, elliptical or oval cross-section in making paper maker's wire cloth and I do not claim the use of weft wire of noncircular section.

I claim:

1. The method of manufacturing paper maker's wire cloth which comprises the following steps: selection of round warp wire of suitable size and material, selection of round weft wire of suitable material and of a diameter not less than the diameter of the warp wire, interweaving the warp and weft wires so that each warp wire passes over one and under two weft wires thereby forming warp knuckles and long sloping weft crimps, the warp and weft wires being interwoven in such ratio that the long weft crimps have crests in substantially the same plane as the crests of the raised warp knuckles, and removing material from the raised projecting warp knuckles to bring them into the same plane with the crests of the long weft crimps and thereafter removing material from both the raised warp knuckles and the long weft crimps to produce flat spots level with one another on both the warp and weft wires.

2. A paper maker's wire cloth consisting of warp and weft wires, each warp wire passing over one and under two or more weft wires and each warp wire being of a circular cross-section substantially equal in area to the circular cross-sectional area of the weft wire, the warp wires forming knuckles where they pass over the weft wires and the weft wires forming sloping raised crimps where they pass over the warp wires, the warp knuckles and weft crimps having flat tops formed by removal of material therefrom, the flat tops of the raised crimps in the weft wires being in a plane with the flat surfaces on the raised warp knuckles, and each raised warp knuckle and weft crimp in vertical section through the middle of the crest having the shape of the major segment of a circle.

3. The method of manufacturing an improved paper maker's wire cloth which comprises weaving a twill wire cloth of warp and weft wires of circular cross-section so that the warp wires form raised warp knuckles and the weft wires form long inclined raised weft crimps having crests raised to the level of a plane which lies at a distance less than half the diameter of the warp wire below the plane of the crests of the warp knuckles and subjecting the wire cloth to a surface grinding operation restricted to grinding down the crests of the raised warp knuckles and the crests of the long weft crimps to form flat surfaces on the crests of the raised warp knuckles level with flat surfaces formed on the crests of the long weft crimps.

WILLIE DUNSTAN THEODORE GREEN.